Oct. 24, 1967                H. SCHMITT               3,348,460
ELECTRONICALLY CONTROLLED APERTURE AND SHUTTER
ARRANGEMENTS FOR USE WITH CAMERAS
Filed Oct. 15, 1965                                             3 Sheets-Sheet 2

Inventor
HELMUT SCHMITT
By: Nolte & Nolte
ATTORNEYS

# United States Patent Office 3,348,460
Patented Oct. 24, 1967

3,348,460
ELECTRONICALLY CONTROLLED APERTURE AND SHUTTER ARRANGEMENTS FOR USE WITH CAMERAS
Helmut Schmitt, Hausen, Bavaria, Germany, assignor to P. Gossen & Co. G.m.b.H., Erlangen, Bavaria, Germany, a firm
Filed Oct. 15, 1965, Ser. No. 496,509
Claims priority, application Germany, May 28, 1965, G 43,717
11 Claims. (Cl. 95—10)

This invention relates to electronically controlled aperture and shutter arrangements for use with cameras.

An object of the invention is to provide an improved arrangement in which the aperture device is adapted to move with a steady and smooth motion, when triggered, between positions associated with the largest and smallest openings thereof.

A further object of the invention is to provide an arrangement in which the shutter device opens concurrently with the opening movement of the aperture device while showing a positive or negative time delay with respect to the selected exposure time, in accordance with the prevailing light conditions.

The invention provides that shortly after the triggering operation, but still before the aperture device is set into motion, a switch means is operated which in turn actuates a timing circuit arrangement which comprises a capacitor and a light sensitive means, wherein the capacitor is adapted to be charged to a threshold level in response to the light sensitive means upon impingement thereon of a predetermined intensity of light whereby threshold level responsive means effect opening of the shutter device by means of an electromagnetic arrangement while the aperture device is opened.

The invention will become more readily apparent from the following description of preferred embodiments thereof shown, by way of example, in the accompanying drawings, in which.

Figure 1:
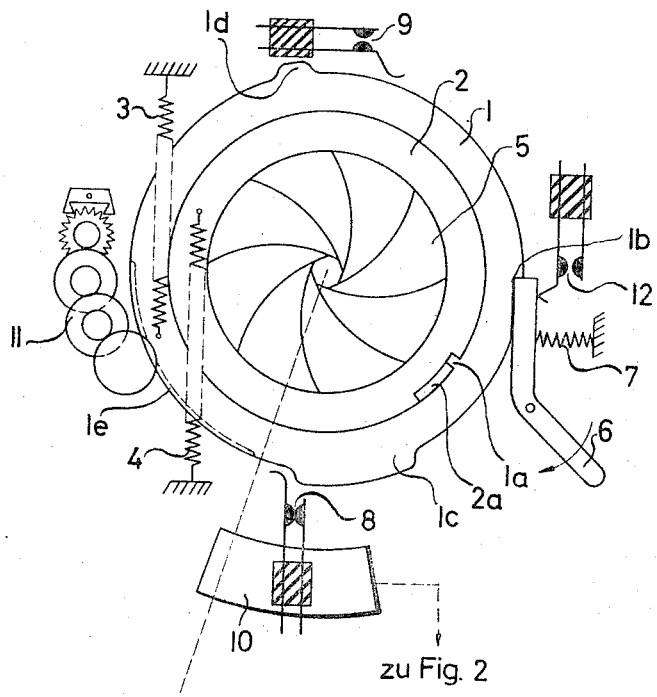
FIG. 1 is a schematic representation of an aperture device and of the associated shutter device in accordance with the invention.
Figure 1:
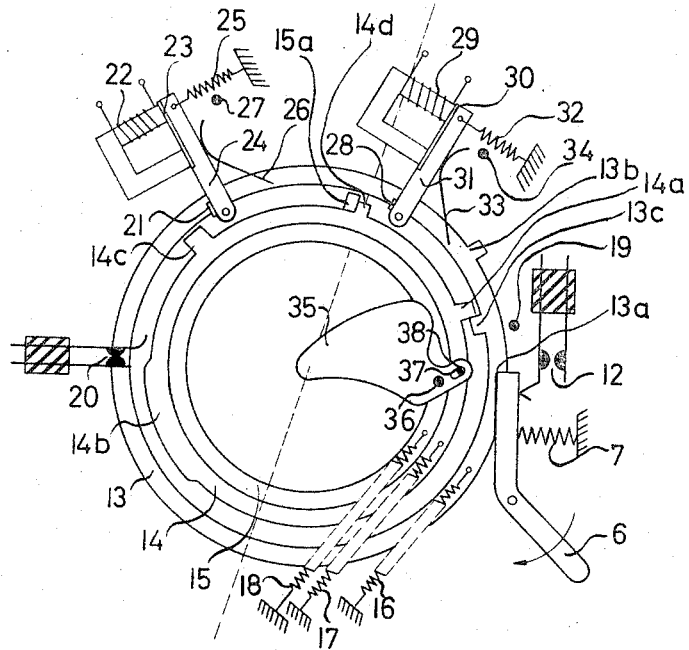

With reference to FIG. 1, particularly the upper portion thereof, it is seen that ring means 1 and 2 are rotatably mounted about the optical axis of the device, and are exposed to the constant pulling effect of spring means 3 and 4, the individual blades 5 of the aperture device being operatively connected with ring means 2 in a known manner. Ring means 1 comprises a projection 1a which cooperates with a recess 2a provided in ring means 2. Ring means 1 further comprises a stop 1b, camming surfaces 1c and 1d, and a toothed portion 1e. Under the pulling force of spring means 3 stop 1b is pressed against an actuating lever 6, which will be held in this position by spring means 7. Camming surfaces 1c and 1d are arranged for cooperation with switch means 8 and 9. Switch means 8 is secured to a plate member 10, the latter being also arranged for movement about the optical axis of the device. Toothed portion 1e cooperates with a movement steadying means, preferably a drag device 11. Actuating lever 6 is disposed so that when it is pivoted in the direction of the arrow contact means 12 are closed.

The lower portion of FIG. 1 shows the mechanical structure of an electronically controlled shutter device, associated with the aperture device is disposed in the upper portion of FIG. 1 and which may be arranged within the camera device either before or after the aperture device and coaxially therewith.

The shutter device comprises ring means 13, 14 and 15 which are rotatably arranged about the optical axis of the device, and are under the pulling effect of spring means 16, 17, and 18. Outer ring means 13 has a stop 13a provided thereon, which stop under the pulling effect of spring means 16 abuts actuating lever 6. Ring means 13 further includes projection 13b, which abuts a stop 19, secured to the housing of the camera device, during a rotation of ring means 13. Ring means 13 further includes a projection 13c, which cooperates with a projection 14a formed on ring means 14. On the periphery of ring means 14 is formed a camming surface 14b which surface operates switching means 20. Ring means 14 further comprises a projection 14c which cooperates with stop 21 of an electromagnetically operable device. The electromagnetically operable device comprises an electromagnet 22 having an armature 23, the latter being integrally formed with lever 24. The lever is under the pulling force of spring means 25, as well as being biased by a leaf spring 26 secured to ring means 13, into engagement with electromagnet 22. A stop 27 serves to limit the motion of lever 24. Ring means 14 further includes a projection 14d, cooperating with the projection 15a of ring means 15. The last mentioned projection 15a cooperates with a stop 28 of another electromagnetically operable device, which again comprises a magnet 29 and armature 30, the latter being integrally formed with a lever 31. The last mentioned magnetic device includes also a tension spring 32, a leaf spring 33 secured to ring means 13, and a stop 34.

There is only a single shutter blade 35 shown in connection with the shutter device. The shutter blades are mounted on ring means 15 and are rotatable about point 36. Shutter blade 35 has a slot 37 provided therein which cooperates with a stud 38 provided on ring means 14.

Figure 2:
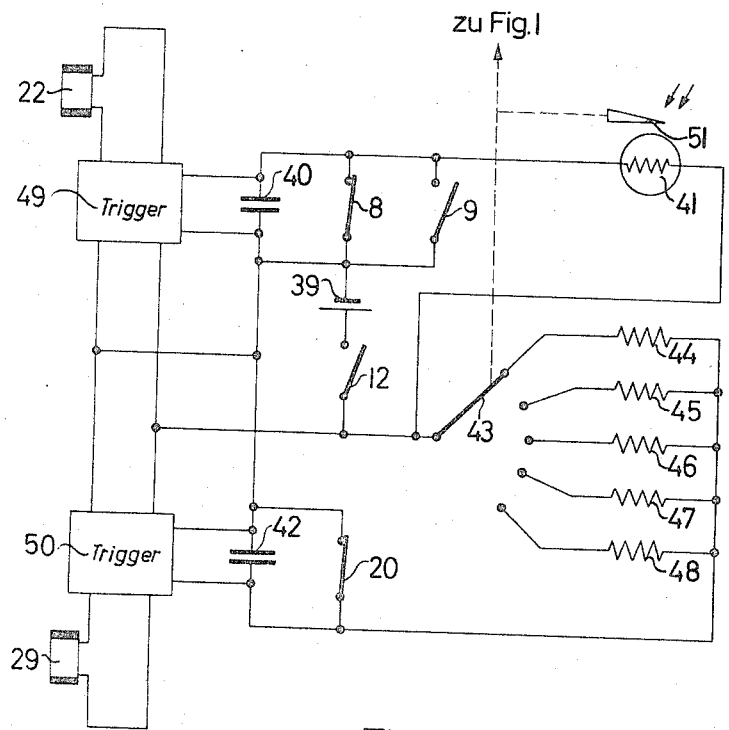
FIG. 2 is a schematic representation of the circuit connections including the timing circuit arrangement associated with FIG. 1.

FIG. 2 is a circuit diagram showing the electrical control circuit associated with the aperture and shutter devices, shown in FIG. 1. The control circuit comprises a source of potential, preferably a D.C. battery 39 for supplying the entire device with energizing current. The control circuit further includes a timing circuit portion comprising a capacitor 40, and a bank of resistors comprising resistors 44–48 having selector switch means 43 associated therewith and cooperative with the capacitor 40 through switching means 12. A light sensitive device 41 is connected in series with capacitor 40 and selector switch means 43. Light sensitive device 41 is preferably a device of the photo-resistor type having variable resistance characteristics as a function of the impinging light intensity thereon. At the output of capacitor 40 trigger means 49, known per se, is disposed, and with its output signal controls the electromagnetically operable device 22, shown in FIG. 1. Electromagnetically operable device 29 is in turn operated by trigger means 50 which is controlled by the output signal of a further capacitor 42 having a similar charging circuit comprising resistors 44–48 as capacitor 40. Capacitor 40 has switching means 8 and 9 in parallel arrangement therewith. Switching means 9 is provided for shunting, when energized, switching means 8 for purposes hereinafter described. Capacitor 42 has in parallel therewith switching means 20. Selector switch means 43 is operatively connected to a neutral wedge 51 for selective shading of the incoming light over light sensitive device 41. The mechanical coupling extends also to plate member 10.

The inventive device operates in the following manner:

After the selection of a desired exposure time by means of selector switch means 43 which in turn also effects appropriate adjustment of neutral wedge 51 covering, and accordingly a portion of the light access to photo-resistor 41, while plate member 10 with switch means 8 thereon is also shifted accordingly about the optical axis of the device by a predetermined angular distance. Lever 6 is actuated against the biasing effect of spring means 7 whereupon switch means 12 is closed inserting battery 39 into the circuit. Electromagnetic devices 22 and 29 will be supplied with current over their associated trigger means 49 and 50, and thereby attract their respective armatures 23 and 30. Shortly after the closing of switch means 12, both ring means 1 and 13 are released by actuating lever 6. The arrangement is such that ring means 13 starts to rotate somewhat earlier than ring means 1. Ring means 13 of the shutter device is caused to rotate under the effect of spring means 16 to such an extent, until the associated projection 13b thereof abuts stop 19. Ring means 14 and 15 rotate concurrently, until projection 14c abuts projection 21. Ring means 1 of the aperture device rotates under the biasing effect of spring 3 in clockwise direction. The rotation of ring means 1 is controlled by drag means 11 in such a manner, that it occurs in a steady fashion. Shortly after the start of the rotational movement, projection 1c opens switch means 8, whereby capacitor 40 starts to charge through photo-resistor 41. Somewhat later, projection 1a carries ring means 2 therewith, so that the blades of the aperture device will open with a steady speed. In the arrangement described, the pulling force of spring 4 is made somewhat weaker than that of spring 3.

In accordance with the prevailing light intensity falling on photo-resistor 41, capacitor 40 will reach a threshold lever earlier or later, in response to which means 49 cuts the exciting current to electromagnet 22. As a result, armature 23 will be rotated by the pulling force of spring 25 away from magnet 22 whereby stop 21 disengages projection 14c, with the result that both ring means 14 and 15 may rotate concurrently further and to such an extent, until projection 15a of ring means 15 abuts stop 28. Ring means 14 will continue to rotate further all by itself, whereby the shutter device reaches its open position.

Switch means 20 has been concurrently opened by camming surface 14b, whereby the charging circuit comprising the capacitor 42 and one of resistors 44–48 is completed. A predetermined selection of one of the resistors 44–48 determines the time during which the shutter is opened. Upon capacitor 42 reaching its threshold level, which means the expiration of the predetermined time, trigger means 50 cuts the excited current to magnet 29. Armature 30 will be pulled away by spring 32 from magnet 29 and stop 28 disengages projection 15a, whereby ring means 15 may rotate further. This will cause the shutter device to close.

During the opening of the aperture device, the film is exposed. Should the exposure time selected by switching means 43, such as for example 30 ms., and the aperture opening time would amount also to about 30 ms., per blade stage, then the film would become overexposed by a half blade stage. With short exposure times of about 2 ms., this error is negligible.

In order to prevent an overexposure in the event of longer exposure times, plate member 10, to which switching means 8 is secured, is mechanically coupled to the time selector switch means 43. Concurrently with the positioning of switch means 43, switch means 8 is also rotated about the optical axis of the device, so that it can be made to be interrupted at different times by camming surface 1c while ring means 1 is in rotation. Therefore, in the event of longer preselected exposure times, the shutter device will open somewhat earlier than the time at which the aperture device reaches the correct opening position thereof, and will close somewhat later by about the same time difference as experienced during the opening.

Light intensity shading device 51 is coupled to selector switch means 43 so that it is capable of shading photo-resistor 41, to a degree which is related to the preselected exposure time. It is obvious that any other type of light intensity shading device may be used to suit any film sensitivity requirements.

Switching means 9, which is actuated to a closed position by projection 1d at a fully open condition of the aperture device, prevents underexposure. Switching means 9 upon its closure will short circuit capacitor 40 to thereby prevent opening of the shutter device. Upon actuation of the trigger lever 6, switch means 12 will open, whereby magnets 22 and 29 have their exciting current cut off. Both ring means 14 and 15 will concurrently rotate without causing the shutter blades to open.

The invention further provides that the the opening of the shutter device accompanied by the release of armature 23, a further rotation of the blades may be prevented by the stopping of drag means 11. In such arrangement, it is not necessary that switch means 8 should be mounted rotatably about the optical axis. Such arrangement has a further advantage in that shorter exposure times may be selected.

Figure 3:
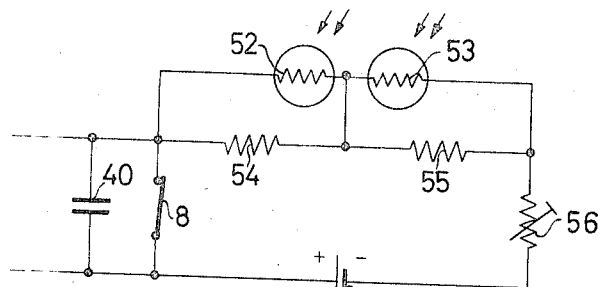
FIG. 3 is another embodiment of the timing circuit arrangement.

In the above described closure control device it is important that photo-resistor 41, which influences the related shutter data, should exhibit a resistance characteristic which may be represented by a substantially straight line in a simple logarithmic coordinate system described by the equation $R = (\log E)$ ($E =$ light intensity, $R =$ resistor value), that is $\Delta R$ should have the same magnitude for all light intensity values. The presently available photo-resistors do not exhibit such characteristic over a longer range of values of the light intensity. It is an important aspect of the present invention that capacitor 40 of the timing circuit is arranged to be charged through a pair of series connected photo-resistors 52 and 53 both of them exhibiting an opposite resistance characteristic. Both photo-resistors are shunted by resistors 54 and 55, respectively, as shown in FIG. 3. The timing circuit further includes a resistor 56 and switch means 8, as shown in FIG. 3, wherein the input leads to the timing circuit shown with dotted lines, are connected to trigger means 49 of FIG. 2. Upon opening of switching means 8, as described above, capacitor 40 will be charged over the circuit portion comprising photo-resistors 52, 53, resistors 54, 55 and 56. Upon reaching the described threshold level, trigger means 49 cuts the exciting current to magnet 22, whereby the opening movement of the shutter device commences.

Figure 4:
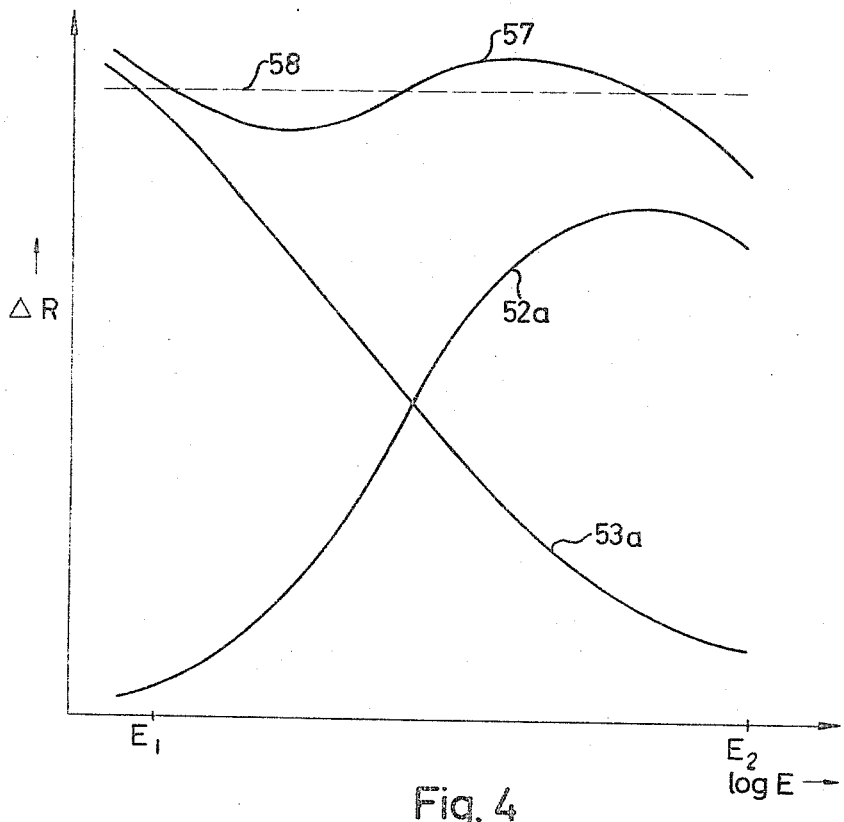
FIG. 4 is a graphical representation of the characteristics of the light sensitive device, which is preferably a photo-resistor, employed in connection with the invention.

Referring now to FIG. 4 which represents the coordinate system $\Delta R = f (\log E)$ in which curve 52a is the combined characteristics of photo-resistor 52 together with resistor 54, while curve 53a is the combined characteristics of photo-resistor 53 together with resistor 55. Upon adding curves 52a and 53a, curve 57 is obtained which ideal conditions should be a straight line, as shown by the dotted line 58.

The characteristics of photo-resistors 52 and 53 are selected such that photo-resistor 52 in combination with its parallel resistor 54 exhibits an increasing ΔR as a function of increasing light intensity, while the ΔR of photo-resistor 53 in combination with its parallel resistor 55 is decreasing at the same time. In accordance with the invention, the total ΔR values should behave so that curve 57 will result in equal increments of ΔR over the entire range of interest, namely between $E_1$ and $E_2$. The small deviations from the ideal curve 58 can be neglected. Resistor 56 in the described timing circuit serves for calibration purposes, i.e. to effect minor adjustments in the entire timing circuit.

Figure 5:
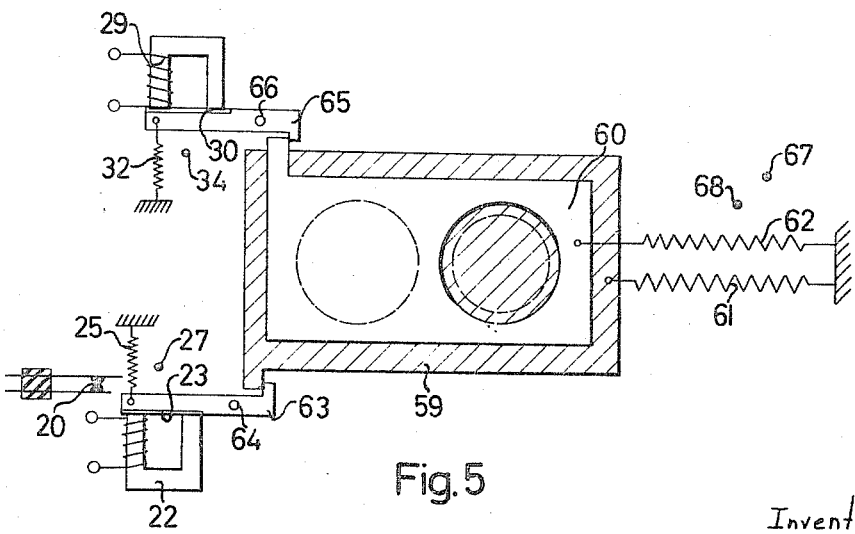
FIG. 5 is a schematic representation of a shutter device of the double slider type embodying principles of the invention.

The control principles of the invention are equally applicable to other embodiments than described in FIG. 1. Such other embodiments is shown in FIG. 5 which represents a simple double-slider shutter device mainly used in inexpensive cameras. This device comprises two shutter plates 59 and 60, which are under the pulling effect of spring means 61 and 62, respectively. Shutter plate 59 will be held in rest position by a hook-like lever 63 of an electromagnetically operable holding device. Lever 63 which is pivotally mounted at point 64 has integrally formed therewith the armature 23 which cooperates with electromagnet 22 as previously described. This electromagnet is in turn coupled with trigger means 49 described in connection with FIG. 2. Lever 63 is under the pulling effect of spring 25. Movement of the armature is limited by stop 27. In the range covered by the pivoting motion of lever 63 is disposed switch means 20 described in connection with FIGS. 1 and 2. Shutter blade 60 cooperates with a further electromagnetically operable device comprising elements 29, 30, 32, 34, 65 and 66, which are of the same structural character as the above described device comprising elements 22, 23, 25, 27, 63 and 64, respectively. Device 29 cooperates with trigger means 50. For limiting the motion of shutter plates 59 and 60 stops 67 and 68, respectively, are provided.

The shutter device shown in FIG. 5 operates according to the same principles as the shutter device described in connection with FIG. 1. In other words, upon actuation of lever 6 in the direction of the arrow, first switching means 12 will be closed, whereby battery 39 will be inserted into the circuit, causing electromagnets 22 and 29 to receive exciting current over the associated trigger means 49 and 50, whereupon armatures 23 and 30 are attracted by their respective magnets. Shortly after switch means 12 has been closed, ring means 1 will be released by actuating lever 6. Ring means 1 will rotate under the pulling effect of spring 3 in a clockwise direction. This motion of ring means 1 will be controlled by drag means 11 in such a manner that it proceeds in a steady fashion. Shortly after the rotational movement has commenced, camming surface 1c will open switching means 8, whereby capacitor 40 will start to charge through photo-resistor 41. A short time thereafter, projection 1a will carry ring means 2 forthwith, so that the aperture blades 5 will open at a constant speed. The pulling force of spring 4 is somewhat weaker than that of spring 3. Capacitor 40 will reach the above described threshold level sooner or later, in dependence of the light intensity falling on photo-resistor 41, whereby trigger means 49 will cut the exciting current to magnet 22. Armature 23 will be pulled away by spring 25 from magnet 22 whereupon the hook-like end portion of lever 63 releases the shutter plate 59, causing an opening of the shutter device. Switching means 20 has been concurrently opened by the released lever 63 whereby the circuit portion comprising capacitor 42 and resistors 44 through 48 become energized. A predetermined selection of any one of resistors 44–48 will control the time during which the shutter device will stay open. Capacitor 42 reaches the corresponding threshold level, upon expiration of the pre-selected time, at which time trigger means 50 will cut the exciting current to magnet 29. Armature 30 will be pulled away from magnet 29 by spring 32 and the hook-like end portion of lever 65 releases the shutter blade 60, which will result in the closing of the shutter device. The means effecting restoration of the shutter blades to their initial positions are not shown in the drawing.

Although, the invention has been described with reference to specific embodiments thereof, it is not intended that the invention should be limited to such specific embodiments, but defined by the scope of the appended claims.

What I claim is:

1. In a camera operable with a light sensitive film, the combination, comprising: an aperture device adapted to move from an initial position to predetermined aperture positions thereof, a shutter device adapted to move from a closed position to an open position and return to said closed position, means for actuating said aperture and shutter devices to commence movement to said predetermined aperture positions and to said open position, respectively, and means for controlling the time increment elapsing between the movement of said shutter device from said closed position and returning thereof to said closed position, said means comprising light sensitive means for sensing the light intensity to which said film is exposed through said aperture device, a source of potential, capacitor means for charging to a predetermined threshold level from said source of potential, variable resistance means connected in circuit relationship with said source of potential and said light sensitive means for controlling attainment of said threshold level by said capacitor means, the arrangement being such that said time increment is less than the time required for said aperture device to move to said predetermined aperture positions thereof.

2. The combination as claimed in claim 1, wherein said capacitor means comprises at least a pair of capacitors, said controlling means further comprising at least a pair of magnetically operable means connected for responding to the threshold level of the respective capacitor means, one of said magnetically operable means effecting release of said shutter device for commencing movement thereby to said open position, the other of said magnetically operable means effecting return of said shutter device to said closed position thereof.

3. The combination as claimed in claim 2, including means for selectively adjusting the beginning of said time increment.

4. The combintion as claimed in claim 1, wherein said light sensitive means comprises at least a pair of photo-resistor means connected in series with respect to each other, each of said photo-resistor means having resistance means connected in parallel therewith, each of said photo-resistor means having a resistance characteristic such that the combined resistance value of said parallel circuits varies by resistance increments remaining substantially constant with respect to adjacent values of different light intensities.

5. The combination as claimed in claim 4, further including calibrating resistor means for fine adjustments of said resistance increments.

6. The combination as claimed in claim 3, wherein said variable resistance means comprises a plurality of resistors, switch means for selectively connecting a predetermined one of said resistors in circuit relationship with said source of potential and said light sensitive means, said switch means being mechanically coupled to said means for selectively adjusting the beginning of said time increment, means permitting selective adjustment of the intensity of light falling on said light sensitive means, said light intensity adjusting means being coupled to said switch means.

7. The combination as claimed in claim 6, wherein said light intensity adjusting means comprises a neutral wedge.

8. The combination as claimed in claim 1, including means coupled to said aperture device for steadying the opening movement of said aperture device.

9. The combination as claimed in claim 1, further including means for preventing charging of said capacitor means under light intensity conditions below a predetermined level.

10. The combination as claimed in claim 9, wherein said preventing means comprises switch means connected to shunt said capacitor means when actuated.

11. The combination as claimed in claim 1, wherein said shutter device is a double-slider device.

References Cited

UNITED STATES PATENTS 3,218,949  11/1965  Kiper _____ 95—10

FOREIGN PATENTS 903,528  8/1962  Great Britain.

NORTON ANSHER, *Primary Examiner.*

JOSEPH F. PETERS, Jr., *Assistant Examiner.*